United States Patent
McCoy et al.

[11] Patent Number: 5,890,726
[45] Date of Patent: Apr. 6, 1999

[54] LOAD LEVELING SYSTEM

[75] Inventors: Richard McCoy, Granger; Chad A. McCoige, Mishawaka, both of Ind.

[73] Assignee: Reese Products, Inc., Elkhart, Ind.

[21] Appl. No.: 734,525

[22] Filed: Oct. 18, 1996

[51] Int. Cl.$^6$ .................................................. B60D 1/42
[52] U.S. Cl. .................................... 280/406.1; 280/455.1
[58] Field of Search ........................... 280/405.1, 406.1, 280/406.2, 407, 455.1, 456.1, 457

[56] References Cited

U.S. PATENT DOCUMENTS

| | | | |
|---|---|---|---|
| 3,347,561 | 10/1967 | Hedgepeth | 280/406.1 |
| 3,353,942 | 11/1967 | Lewis | 280/406.1 |
| 3,600,004 | 8/1971 | Newkirk | 280/406.1 |
| 3,731,950 | 5/1973 | Burcham | 280/406.1 |
| 5,375,867 | 12/1994 | Kass et al. | 280/457 |

*Primary Examiner*—Kevin Hurley
*Attorney, Agent, or Firm*—King and Schickli

[57] ABSTRACT

A load leveling hitch assembly is provided for towing a trailer behind a vehicle. The load leveling hitch assembly includes a drawbar for mounting to the vehicle, a ball mount secured to the drawbar, a pair of spring bar mounting brackets secured to the trailer and a pair of spring bars. Each spring bar bracket is characterized by including multiple spaced mounting points for receiving the distal ends of one of the spring bars. Each spring bar has a proximal end secured to the ball mount and a distal end that is held by one of the spring bar mounting brackets.

9 Claims, 2 Drawing Sheets

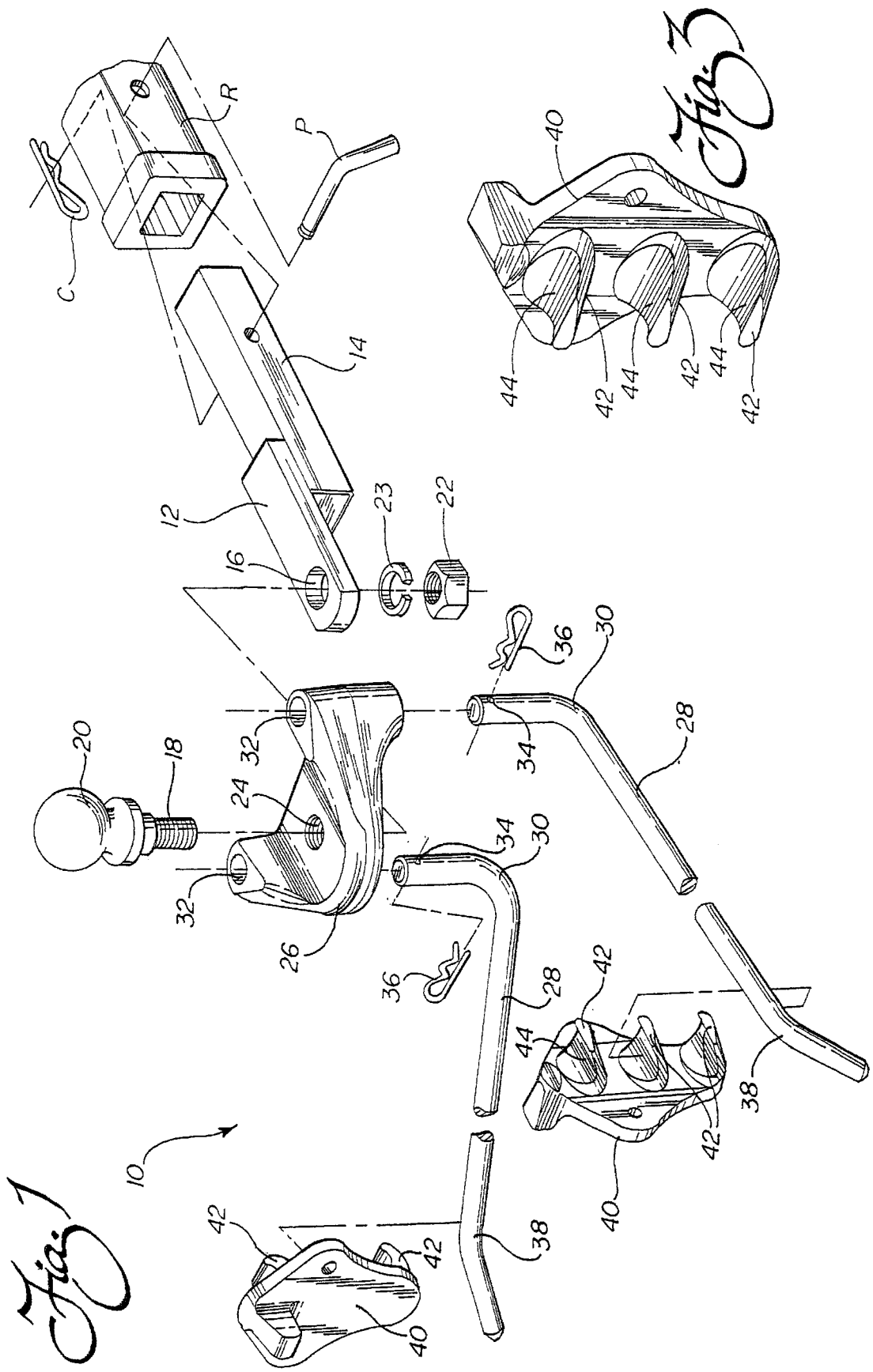

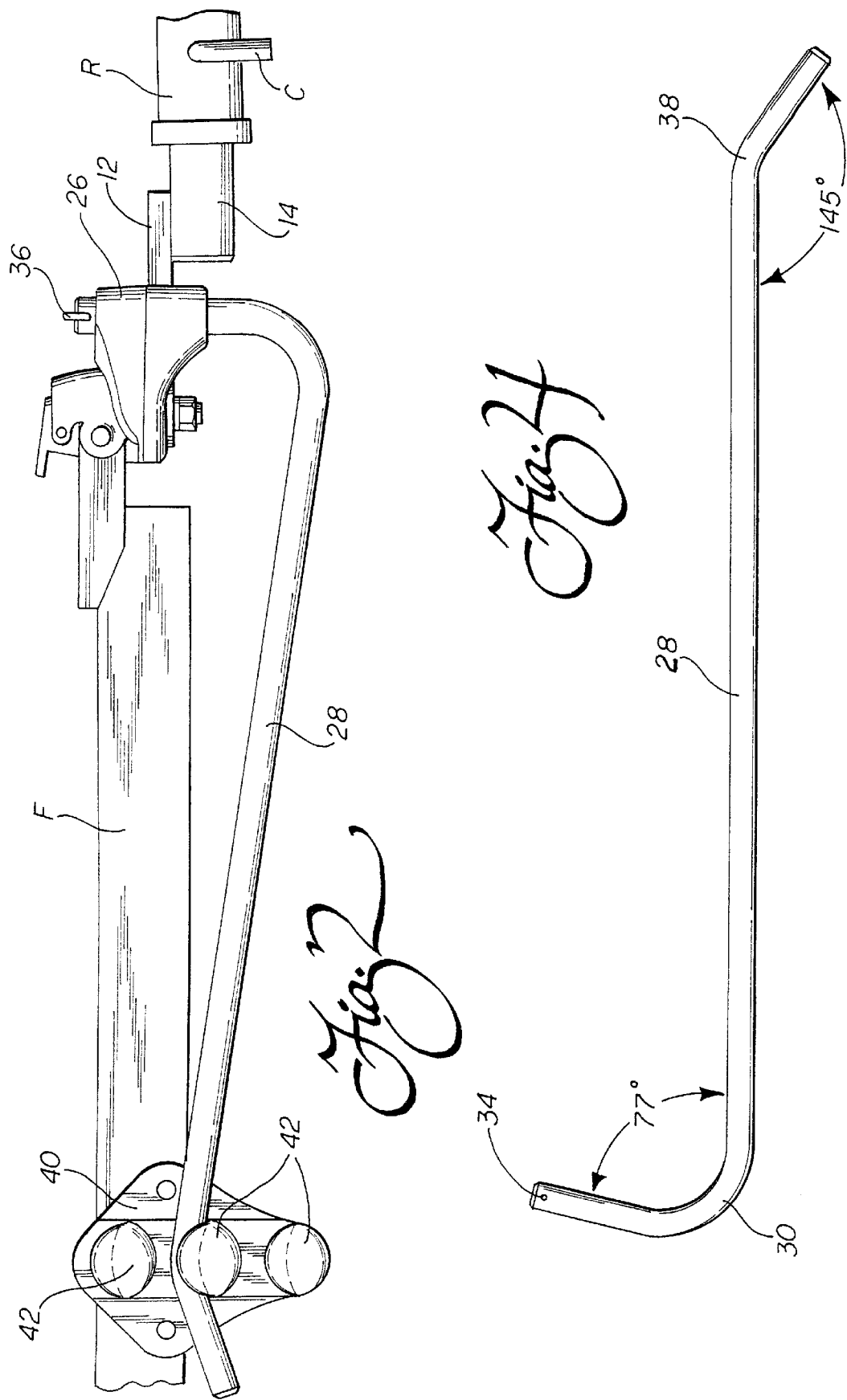

LOAD LEVELING SYSTEM

TECHNICAL FIELD

The present invention relates generally to the towing field and, more particularly, to a new and improved lightweight load leveling hitch assembly providing convenient adjustability of weight distribution as well as trailer anti-sway action.

BACKGROUND OF THE INVENTION

Hitch assemblies for more evenly distributing the tongue weight of a trailer over the front and rear axles of a towing vehicle are well known in the art. A particularly advanced design of weight distributing hitch assembly is disclosed in the assignee's issued U.S. Pat. No. 5,375,872 to Kass et al. entitled "Weight Distributing Hitch". This hitch assembly includes a hitch bar for receipt in a receiver mounted to the vehicle and a ball mount head for mounting on the hitch bar at a selected tilt angle. A pair of spring bars are mounted at their proximal end to the ball mount head. The distal ends of these spring bars are connected by means of cooperating lift units and chains to the frame of the trailer. Such state of the art lift units are exemplified by Reese Products, Inc. product number 21160 incorporating a body that is mounted to the trailer frame, a chain hook with pivoting locking lever and a safety pin for securing the chain hook and lever in an operative position. As is known in the art, the amount of leveling or load transfer to the front axle of the vehicle is adjusted by engaging different links of the chains with the chain hooks of the lift units.

While such an arrangement is effective for its intended purpose, the lift units must be properly mounted to the trailer frame and the proper chain links engaged in the chain hooks in order to provide proper operation and a desired distribution of weight. While relatively simple, these procedures require some time to complete and may frustrate and annoy certain impatient individuals. This is particularly true when trying to readjust the amount of leveling or load transfer when out on the road. Accordingly, a need is identified for a weight distributing hitch assembly allowing even greater ease and convenience of installation and operation. This is particularly true with respect to the connection of the distal end of the spring bars to the trailer frame in order to provide the weight distributing action.

It is also desirable to provide the weight distributing hitch assembly with some built-in sway control; that is a resistance to trailer sway which otherwise tends to occur under certain varying operating conditions. The state of the art weight distributing hitch assemblies incorporating lift units and chains as described above are unable to provide any such anti-sway function.

SUMMARY OF THE INVENTION

Accordingly, it is a primary object of the present invention to provide the load leveling hitch assembly for towing a trailer behind a towing vehicle overcoming the above-described limitations and disadvantages of the prior art.

Another object of the present invention is to provide a lightweight load leveling hitch assembly providing not only a load leveling function but also effective damping to resist trailer sway and thereby provide sway control.

Yet another object of the present invention is to provide a lightweight load leveling hitch assembly wherein different levels of load leveling and some inherent anti-sway control may be provided by a simple and convenient operation.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved load leveling hitch assembly is provided for towing a trailer behind a vehicle. The load leveling hitch assembly includes a drawbar which may be of conventional design for mounting to the vehicle. A ball mount is secured to the drawbar. A pair of spring bar mounting brackets are secured to the trailer. Each spring bar mounting bracket includes multiple, spaced mounting points for receiving the distal end of a spring bar. Thus, each spring bar mounting bracket includes at least two projecting lugs, each projecting lug defining a notch for receiving the distal end of a spring bar.

Finally, the load leveling hitch assembly includes a pair of spring bars. Each spring bar has a proximal end secured to the ball mount and a distal end held in one of the notches in one of the spring bar mounting brackets. Further, it should be appreciated that each spring bar includes a first bend of between 70°–85° adjacent to the proximal end thereof and a second, opposite bend of substantially 140°–150° adjacent to the distal end thereof. As will be described in greater detail below, it is this second bend and the engagement of this portion of the spring bar within the notch that produces the desired resistance to trailer sway.

It should be appreciate that the load distribution provided by the load leveling hitch assembly of the present invention may be easily adjusted. Specifically, the projecting lugs on the spring bar brackets that define the notches to receive the spring bars are spaced vertically along the trailer frame. Load distributing action is increased by inserting the distal end of the spring bar in a relatively higher notch and decreased by inserting a distal end of the spring bar in a relatively lower notch. For a lightweight load leveling hitch assembly of the type being described, the spring bar is sufficiently flexible to allow an individual to easily manually grasp the distal end of the spring bar and raise or lower the spring bar as necessary to engage the next higher or lower notch. Thus, the adjustment may be conveniently made in a manner of only moments.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing:

FIG. 1 is an exploded view of the load leveling hitch assembly of the present invention;

FIG. 2 is a partial, schematical view showing the load leveling hitch assembly of the present invention connected between the vehicle and a trailer;

FIG. 3 is a detailed perspective view of the spring bar mounting bracket of the present invention; and FIG. 4 is a detailed side elevational view of the spring bar of the present invention.

Reference will now be made in detail to the present preferred embodiment of the invention, an example of which is illustrated in the accompanying drawing.

DETAILED DESCRIPTION OF THE INVENTION

Reference is now made to FIG. 1 showing the load leveling hitch assembly 10 of the present invention. As should be appreciated, the hitch assembly 10 includes a drawbar 12 of a type well known in the art including either a solid or tubular mounting post 14 for engagement in the receiver box R of a hitch receiver mounted to a vehicle (for purposes of simplicity the full hitch receiver and vehicle are not shown). There, the draw bar 12 may be secured by means of a connecting pin P and spring clip C in a manner known in the art. Such a hitch receiver is, for example, a Class 2 89 Series ShadowMount hitch receiver or a Class 2 06 Series Insta-Hitch hitch receiver as manufactured by Reese Products, Inc. of Elkhart, Ind., the assignee of the present invention.

The distal end of the draw bar 12 includes an aperture 16 for receiving the threaded stem 18 of a hitch ball 20 which may be secured thereto by means of a locking nut or a lock nut 22 and washer 23 tightened to the desired torque. Such a hitch ball 20 is generally constructed of solid steel in a wide variety of sizes and finishes in order to fit all towing needs. Preferably such a hitch ball 20 complies with all safety specifications and requirements of VESC Regulations V-5.

As should be further appreciated from reviewing FIG. 1, the threaded stem 18 of the hitch ball 20 is of sufficient length so as to also pass through the mounting aperture 24 in the ball mount 26. Thus, the ball mount 26 is mounted to the drawbar 12 by means of the hitch ball as shown in FIGS. 1 and 2. Advantageously, the ball mount 26 is a relatively small, lightweight element that might be easily and conveniently fixed in place or removed as desired depending upon operator preference and the need of the operator for weight distributing hitch capability.

A pair of spring bars 28 are releasably attached or mounted to the ball mount 26. More specifically, as best shown in FIG. 3, each spring bar 28 includes a first bend 30 defining an included angle of between substantially 70°–85° and more preferably 77°±2° adjacent to a proximal end thereof; that is, the end received in a spring bar mounting aperture 30 that allows pivotal movement of the spring bar relative to the ball mount 26. When fully engaged in the spring bar mounting aperture 32, the proximal tip of the spring bar including the aperture 34 projects above the ball mount 26. A connecting pin 36 is inserted through the aperture 34 in order to secure the spring bar 28 in position.

The spring bar 28 also includes a second bend 38 adjacent the distal end thereof defining an included angle of between substantially 140°–150° and more preferably 145°±3° (note particularly FIG. 3). Preferably, each spring bar is constructed from hot rolled steel, such as, for example, 4140 or 4150 steel which is heat treated to provide a Rockwell C Hardness between 35–45.

The load leveling hitch assembly 10 also includes a pair of spring bar mounting brackets 40. As best shown in FIG. 2, one spring bar mounting bracket 40 is mounted to each side of the trailer frame F (only one shown). This mounting may be by welding, bolting or any other appropriate means. Each spring bar mounting bracket 40 comprises a series of vertically spaced projecting lugs 42. Each lug 42 defines a notch 44 for receiving the distal end of a spring bar 28.

More specifically, when the towing vehicle and trailer are aligned along a straight line, the crotch or elbow of the second bend 38 is held in the notch 44. Of course, it should be appreciated that during the towing operation the spring bar 28 slides freely through the notch 44. However, in the event of trailer sway as a result of cross winds or other adverse road conditions, the spring bar 28 slides through the notch 44 relative to the weight supporting projecting lug 42. When this occurs, the second bend 38 effectively functions to increase the resistance to this sliding movement thereby damping or suppressing sway. In this way, the hitch assembly 10 of the present invention provides a measure of built-in anti-sway control. It should be appreciated, however, that this resistance may be easily overcome when turning the vehicle in the desired direction. Accordingly, the anti-sway action is provided without any impairment of vehicle control.

It should also be appreciated that the amount of weight distribution or load shifting that may be provided by the hitch assembly 10 may be very easily adjusted in a quick and convenient manner. More specifically, as shown in FIG. 2, the spring bar 28 is engaged in the notch 44 defined by the intermediate lug 42. If the vehicle operator determines that greater weight distribution and load shifting effect is desired, the operator simply needs to position the trailer and vehicle in a straight line. Next, the operator needs to manually grasp the distal end of one of the spring bars 28 projecting from the spring bar mounting bracket 40. The spring bar 28 is sufficiently flexible to be lifted and laterally shifted so as to be pulled free from the intermediate notch 44.

In the event it is desired to increase the weight distributing and load shifting effect of the hitch assembly 10, the second bend 38 of the spring bar 28 is then positioned in the notch 44 defined by the uppermost or top projecting lug 42. Conversely, if it is desired to reduce the weight distributing and load shifting characteristics of the hitch assembly 10, the spring bar 28 is positioned so that the bend 38 in the spring bar engages in the lowermost notch 44 defined by the lowermost lug 42. This procedure is then followed for the other spring bar 28 so that both spring bars are always maintained in the corresponding uppermost, intermediate or lowermost notches 44 defined by the projecting lugs 42 of the two brackets 40. This is an extremely simple and straightforward procedure that may be performed in a matter of moments without tools and with a minimum of difficulty. Thus, it should be appreciated that the hitch assembly 10 of the present invention is particularly user friendly.

In summary, numerous benefits result from employing the concepts of the present invention. A lightweight load leveling hitch assembly 10 is provided of relatively simple and inexpensive construction. Advantageously, it allows an individual to easily tailor and customize the load shifting or weight distributing characteristics as desired. In fact, adjustment may be completed without the use of any tools and in a manner of only a few moments.

It should further be appreciated that the load leveling hitch assembly of the present invention inherently provides anti-sway control. Specifically, the second bend 38 of each spring bar 28 engages in one of the notches 44 defined by one of the lugs 42 in a bracket 40. Advantageously, the contour of the spring bar bend 38 resists sliding through the notch 44 and thereby suppresses sway of the trailer relative to the towing vehicle.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. A load leveling hitch assembly for towing a trailer behind a vehicle, comprising:

a draw bar for mounting to the vehicle;

a ball mount secured to said draw bar;

a pair of spring bar mounting brackets secured to the trailer; and a pair of spring bars, each having a proximal end secured to said ball mount and a distal end held by one of said spring bar mounting brackets and each including a first bend adjacent said proximal end and a second, substantially opposite bend adjacent said distal end;

said load leveling hitch being characterized by each of said spring bar mounting brackets including multiple spaced mounting points for receiving said distal end of one of said spring bars.

2. The load leveling hitch assembly set forth in claim 1, further including a hitch ball for selectively engaging the trailer and securing said ball mount to said drawbar.

3. The load leveling hitch assembly set forth in claim 1, further including a hitch receiver that is secured to the vehicle and receives said drawbar.

4. The load leveling hitch assembly set forth in claim 1, wherein said first bend defines an included angle of between substantially 70°–85° and said second bend defines an included angle between substantially 140°–150°.

5. The load leveling hitch assembly set forth in claim 1, wherein said multiple spaced mounting points are formed by at least two projecting lugs, each projecting lug defining a notch for receiving said distal end of one of said spring bars.

6. The load leveling hitch assembly set forth in claim 4, wherein each of said spring bar brackets includes at least two projecting lugs, each projecting lug defining a notch for receiving said distal end of one of said spring bars.

7. A load leveling hitch assembly for towing a trailer behind a vehicle, comprising:

a ball mount;

a pair of spring bar mounting brackets secured to the trailer; and a pair of spring bars each having a proximal end secured to said ball mount and a distal end held by one of said spring bar mounting brackets and each including a first bend adjacent said proximal end and a second, substantially opposite bend adjacent said distal end;

said load leveling hitch being characterized by each of said spring bar brackets including multiple spaced mounting points for receiving said distal end of one of said spring bars.

8. A load leveling hitch assembly for towing a trailer behind a vehicle, comprising:

a draw bar for mounting to the vehicle;

a ball mount secured to said draw bar;

a pair of spring bar mounting brackets secured to the trailer; and a pair of spring bars, each having a proximal end secured to said ball mount and a distal end held by one of said spring bar mounting brackets;

said load leveling hitch being characterized by each of said spring bar mounting brackets including multiple spaced mounting points for receiving said distal end of one of said spring bars, said multiple spaced mounting points being formed by at least two projecting lugs, each projecting lug defining a notch for receiving said distal end of one of said spring bars.

9. A load leveling hitch assembly for towing a trailer behind a vehicle, comprising:

a ball mount;

a pair of spring bar mounting brackets secured to the trailer; and a pair of spring bars each having a proximal end secured to said ball mount and a distal end held by one of said spring bar mounting brackets;

said load leveling hitch being characterized by each of said spring bar brackets including multiple spaced mounting points for receiving said distal end of one of said spring bars, said multiple spaced mounting points being formed by at least two projecting lugs, each projecting lug defining a notch for receiving said distal end of one of said spring bars.

* * * * *